(12) United States Patent
Unland et al.

(10) Patent No.: US 6,745,749 B2
(45) Date of Patent: Jun. 8, 2004

(54) METHOD FOR ADJUSTING ADAPTIVE PROGRAMME MAPS OF AN ADAPTIVE KNOCK CONTROL IN AN INTERNAL COMBUSTION ENGINE AND A METHOD FOR ADJUSTING THE KNOCK CONTROL IN SAID ENGINE

(75) Inventors: Stefan Unland, Vaihingen-Kleinglattbach (DE); Axel Heinstein, Wimsheim (DE); Michael Gundlach, Asperg (DE); Werner Haeming, Neudenau (DE); Martin Ludwig, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,149
(22) PCT Filed: Mar. 17, 2001
(86) PCT No.: PCT/DE01/01027
§ 371 (c)(1), (2), (4) Date: May 30, 2003
(87) PCT Pub. No.: WO01/79678
PCT Pub. Date: Oct. 25, 2001

(65) Prior Publication Data
US 2003/0183203 A1 Oct. 2, 2003

(30) Foreign Application Priority Data
Apr. 19, 2000 (DE) .......................... 100 19 400

(51) Int. Cl.[7] ................................. F02P 5/00
(52) U.S. Cl. ...................... 123/406.32; 123/406.33; 701/111
(58) Field of Search ................. 123/406.29, 406.32, 123/406.33; 701/111

(56) References Cited

U.S. PATENT DOCUMENTS

| | | | | |
|---|---|---|---|---|
| 4,594,983 A | * | 6/1986 | Takahashi et al. | 123/406.33 |
| 4,700,677 A | * | 10/1987 | Bonitz et al. | 123/406.33 |
| 4,915,079 A | * | 4/1990 | Holmes | 123/406.29 |
| 5,076,235 A | * | 12/1991 | Nagel et al. | 123/406.33 |
| 5,090,382 A | * | 2/1992 | Bolander et al. | 123/406.33 |
| 6,283,093 B1 | * | 9/2001 | Lautenschuetz et al. | 123/406.33 |

FOREIGN PATENT DOCUMENTS

| | | |
|---|---|---|
| DE | 40 08 170 | 9/1991 |
| DE | 41 09 433 | 9/1992 |
| WO | WO 97 30286 | 8/1997 |

* cited by examiner

Primary Examiner—Thomas N. Moulis
(74) Attorney, Agent, or Firm—Kenyon & Kenyon

(57) ABSTRACT

Proposed is a method for adjusting an adaptive characteristics map of an adaptive engine-knock control system and a method for adaptively controlling engine knock, the adaptive characteristics map being defined by at least one operating parameter, the adaptive characteristics map for each operating-parameter range being made up of a precontrol component that characterizes the ambient conditions, and a residual component that results from the engine-knock control, the value of the adaptive characteristics map for each operating-parameter range being given by the sum of the precontrol component corresponding to the specific operating-parameter range, and the residual component corresponding to the specific operating-parameter range. In this context, the adjustment of the adaptive characteristics map is carried out by initially determining if ambient conditions have changed, and by subsequently ascertaining a new precontrol component as a function of the changed ambient conditions for each operating-parameter range, if the ambient conditions have changed, or by holding the precontrol component constant for each operating-parameter range, if the ambient conditions have not changed.

13 Claims, 3 Drawing Sheets

METHOD FOR ADJUSTING ADAPTIVE PROGRAMME MAPS OF AN ADAPTIVE KNOCK CONTROL IN AN INTERNAL COMBUSTION ENGINE AND A METHOD FOR ADJUSTING THE KNOCK CONTROL IN SAID ENGINE

FIELD OF THE INVENTION

The present invention relates to a method for adjusting an adaptive characteristics map of an adaptive engine-knock control system and a method for adaptively controlling the knock of an internal combustion engine.

BACKGROUND INFORMATION

A method for adjusting an adaptive characteristics map of an adaptive engine-knock control system is already known, where, in each case, current ignition-retard values are written to an adaptive characteristics map continuously, or in specific time intervals. In the event of a sharp change in the ambient conditions, for example when using a fuel that is less knock-resistant, the adaptive characteristics-map value is slowly adjusted as a function of the occurring knock signals, and each characteristics-map range must be entered at least once, in order to adjust the entire adaptive characteristics map.

A method for adaptively controlling the knock of an internal combustion engine is known from German Published Patent Application No. 40 08 170, where the current ignition-retard values are stored in an adaptive characteristics map. The adaptive characteristics map has subdivided ranges dependent on at least one operating parameter of the internal combustion engine, one value of ignition retard always being stored in the appropriate range, during operation. Upon shifting to another operating-parameter range, the ignition-retard value stored for this operating-parameter range forms the new ignition-retard value, which is the starting point for the engine-knock control. The characteristics-map value is adapted in the specific operating-parameter range in accordance with the signal of the engine-knock control system, the ignition being retarded in response to engine knock. If no engine knock occurs over a certain period of time, the ignition timing is advanced again.

SUMMARY OF THE INVENTION

In comparison with the known methods, the method of the present invention for adjusting an adaptive characteristics map of an adaptive engine-knock control system has the advantage that, in response to a sharp change in the ambient conditions, the ignition-retard value is immediately adapted without unnecessary engine knock occurring. It should be regarded as a further advantage, that the entire adaptive characteristics map is adjusted to the modified ambient conditions, which likewise results in prevention of unnecessary engine knock, and the new ambient conditions are already taken into consideration in response to changing to a new operating-parameter range. It is particularly advantageous that a change in the ambient conditions is detected, when the currently required ignition-retard value markedly differs from a reference angle corresponding to the specific operating-parameter range. Therefore, such a change in the ambient conditions may be detected easily and quickly. In this context, it is advantageous to generate a reference value from the current adaptive characteristics-map values. Upon detecting a change in the ambient conditions, it is also advantageous to calculate a factor, which describes which range between the worst possible adaptive characteristics-map value and the best possible adaptive characteristics-map value contains the current ignition-retard value, so that adaptive characteristics-map values may then be adjusted for each operating-parameter range in accordance with the factor. Thus, it is possible to adjust the entire adaptive characteristics map in a simple and quick manner. It is particularly simple to calculate the factor, when a straight line is interpolated between the best possible characteristics-map value and the worst possible characteristics-map value. It is likewise advantageous to establish the change in ambient conditions, using sensor values, since this allows the ambient conditions to be assessed in a more objective manner. The ambient temperature or the fuel quality especially influence the knock frequency. Therefore, is advantageous to monitor these conditions, using sensors. In the case of monitoring the ambient conditions, using sensors, it is also advantageous to characterize the new ambient conditions with respect to the best possible and worse possible ambient conditions, using a factor, as well as to ascertain the adaptive characteristics map adjusted to the new ambient conditions, using the factor. Consequently, it is once again possible to adjust the entire adaptive characteristics map in a simple manner. Furthermore, it is advantageous to design the adaptive characteristics map in a cylinder-selective manner and therefore adjust the adaptive characteristics map in a cylinder-selective manner, as well.

In comparison with the known method, the method of the present invention for adaptively controlling the knock of an internal combustion engine has the advantage that the ambient conditions are taken into consideration, it being possible to react very quickly to changed ambient conditions. In addition, it is advantageous that operating-state changes characterized by the occurrence of engine knock may be detected very quickly, it Since each cylinder or each cylinder group has its own combustion characteristics, it is, in this case, advantageous to implement the adaptive engine-knock control in a cylinder-selective or cylinder-group-selective manner.

DETAILED DESCRIPTION

During the operation of an internal combustion engine, so-called engine knock represents a critical operating state that can unfavorably affect the service life. A so-called engine-knock control system is known, which retards the ignition in response to detecting knock in a cylinder of the engine. This allows the knocking condition to be eliminated. If no engine knock occurs after a certain period of time elapses, then the ignition timing is advanced again. In order to obtain, in a particularly rapid manner, an ignition-retard value at which no knock occurs, in response to changing operating-parameter ranges, a so-called adaptive characteristics map is made available in the memory of a control unit. This is described in detail in DE 40 08 170. This adaptive characteristics map, which is defined by at least one operating parameter, is subdivided into specific, fixed ranges. For each range, the memory receives an ignition-retard value that saves the specific ignition-retard value set upon leaving the operating-parameter range. In the event of a repeated shift into the specific operating-parameter range, the ignition-retard value stored there is set and used as a starting point for controlling engine knock. Therefore, in the event of a change of operating-parameter ranges, the ignition-retard values optimal for controlling engine knock may be set very rapidly. In this context, operating parameters include, in particular, the load and the engine speed.

Figure 2:
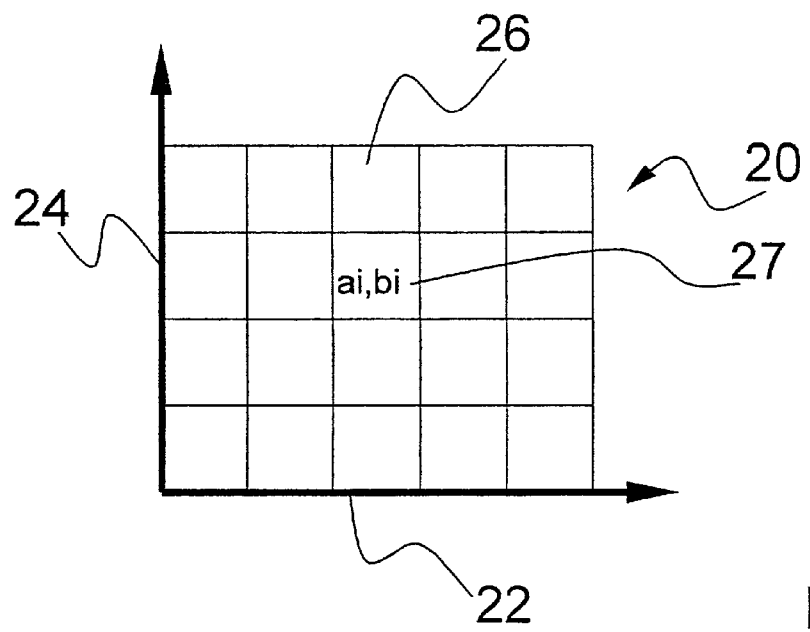
FIG. 2 shows a schematic of an adaptive characteristics map.

Ignition-retard values are not only a function of operating parameters, but also a function of ambient conditions, in particular the quality of the fuel, i.e. the knock resistance of the fuel, and the ambient temperature. In response to a change in the ambient conditions, e.g. when using another fuel, the ignition-retard value is significantly affected to some extent. In order to take this dependence into account, the present invention now provides for each ignition-retard value contained in an adaptive characteristics map being expressed as a sum of a precontrol component bi and a residual component ai. In this context, the precontrol component contains the portion of the ignition-retard value that is a function of the ambient conditions, and residual component ai contains the portion of the ignition-retard value that is directly affected by the engine-knock control. Such an adaptive characteristics map is shown schematically in FIG. 2. The adaptive characteristics map represented in FIG. 2 is exemplarily depicted for two operating parameters, e.g. the load or the engine speed. However, such a characteristics map may also be defined by one operating parameter or more than two operating parameters. Values of a first operating parameter, e.g. the load, are plotted on axis 22. Values of a second operating parameter, e.g. the engine speed, are plotted on axis 24. If the values of the axis of first operating parameter 22 and second operating parameter 24 are now subdivided into individual ranges, then a matrix of operating-parameter ranges 26 is formed, as is represented in FIG. 2. All of the operating-parameter ranges 26 together define adaptive characteristics map 20. Each such operating-parameter range is now assigned a residual component ai and a precontrol component bi, as is exemplarily represented in operating-parameter range 27. Therefore, adaptive characteristics map 20 has a number of precontrol-component values bi corresponding to the number of operating-parameter ranges, as well as the same number of residual-component values ai. Therefore, the adaptive characteristics map contains a total of twice as many values as the operating-parameter ranges. In this context, the ignition-retard value is expressed by the sum of residual component ai and precontrol component bi for each operating-parameter range.

Figure 1:
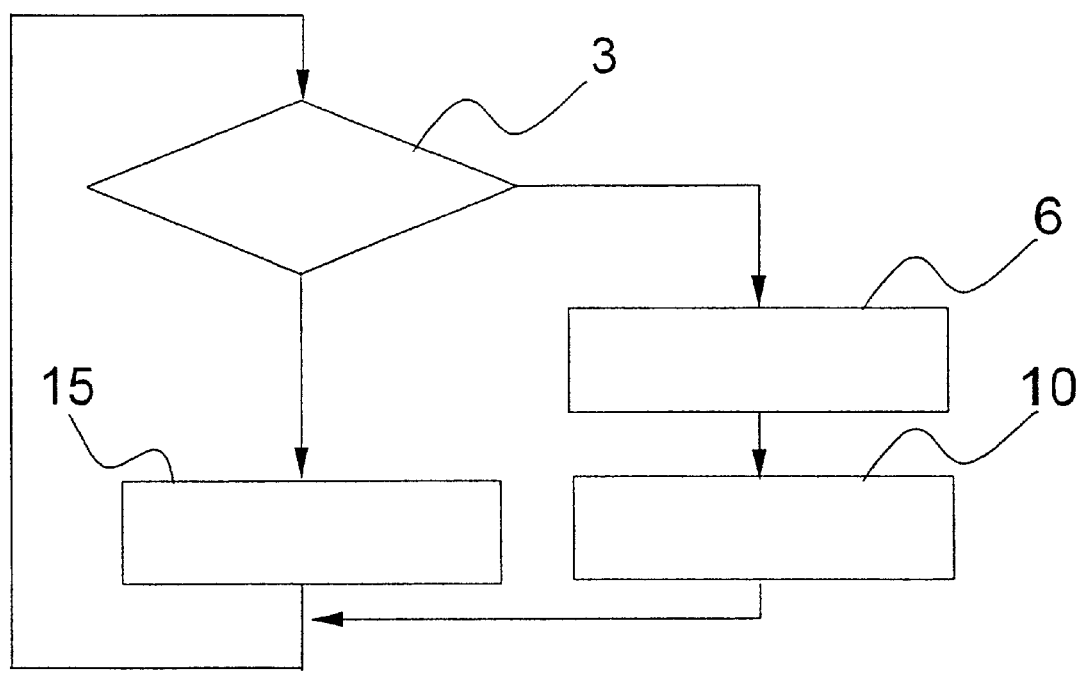
FIG. 1 shows a schematic of a method of the present invention for adjusting an adaptive characteristics map of an adaptive engine-knock control system.

The method of the present invention for adjusting the adaptive characteristics map of an adaptive engine-knock control system is schematically represented in FIG. 1. In this context, it is determined in step 3 if the ambient conditions have changed. If this is the case, then the method resumes with step 6. In step 6, a criterion is determined, with the aid of which a new precontrol component bi is determined in the subsequent step 10, for each operating-parameter range 26 of adaptive characteristics map 20. The method then repeats step 3. If the determination in step 3 has established that the ambient conditions have not changed, then, in step 15, the precontrol-component value bi of each operating-parameter range 26 of adaptive characteristics map 20 is retained in unmodified form. In this case, the method also repeats step 3 after step 15. The continuation of the method with step 3 is generally carried out in specific time intervals. The method represented with the aid of FIG. 1 ensures that, for each operating-parameter range 26, adaptive characteristics map 20 is very quickly adjusted to the changed ambient conditions. This is advantageous since, in this manner, unnecessary incidences of engine knock are prevented, and the destruction of the internal combustion engine is prevented.

In a preferred exemplary embodiment, the determination of whether or not the ambient conditions have changed is carried out, using the current ignition-retard value determined by the engine-knock control system. In this context, the current ignition-retard value determined by the engine-knock control system is compared to a reference value assigned to the current operating parameters, and it is determined if a first threshold value is exceeded. When a first threshold value is exceeded, i.e. the current ignition-retard value sharply deviates from the reference value, it is concluded that the ambient conditions have markedly changed, that is to say, the method is continued with step 6. If the first threshold value is not exceeded, it is then concluded that the ambient conditions have not changed or have only changed to a very small extent, that is to say, the method is continued with step 15. In a preferred exemplary embodiment, such a reference value is represented by the specific adaptive characteristics-map value, which is present for the corresponding operating-parameter range and results from the sum of residual component ai and precontrol component bi. In another preferred exemplary embodiment, such a reference value is ascertained in a master range, in that, for example, several adjacent operating-parameter ranges together form a master range, and an average value of the adaptive characteristics-map values is calculated as a reference value from these operating-parameter ranges belonging to the master range. In this context, the adaptive characteristics-map value of each operating-parameter range is in turn calculated from specific residual component ai and specific precontrol component bi. In this context, such an average value can be, for example, the arithmetic mean of the adaptive characteristics-map values.

Figure 3A:
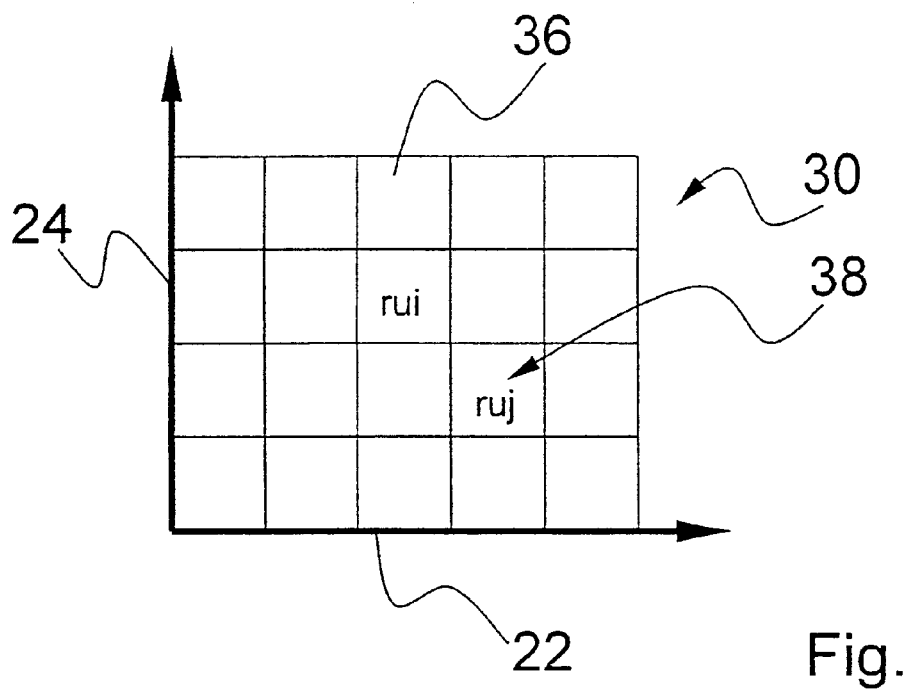
FIG. 3 shows a schematic of a first and a second limiting characteristics map.
Figure 3B:
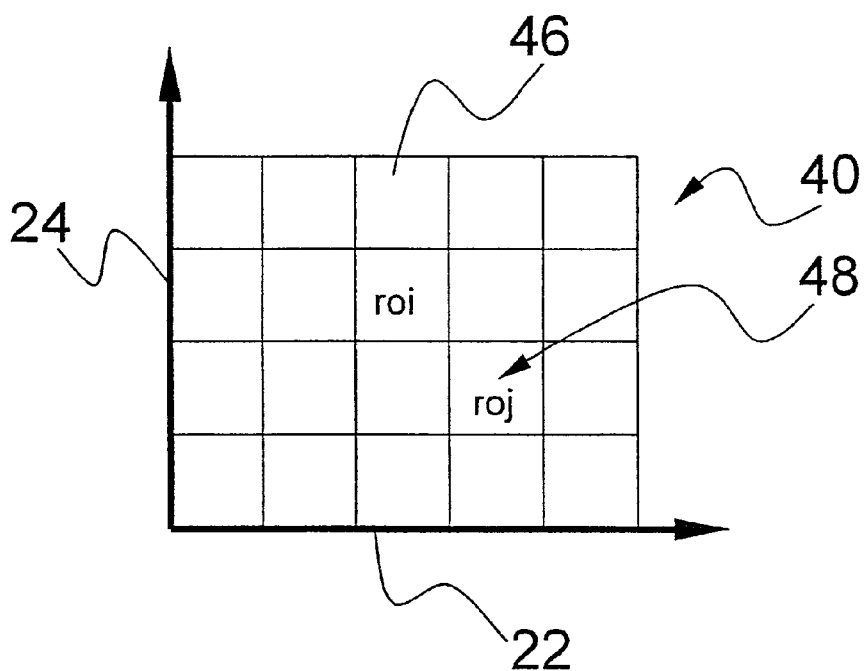
Figure 4:
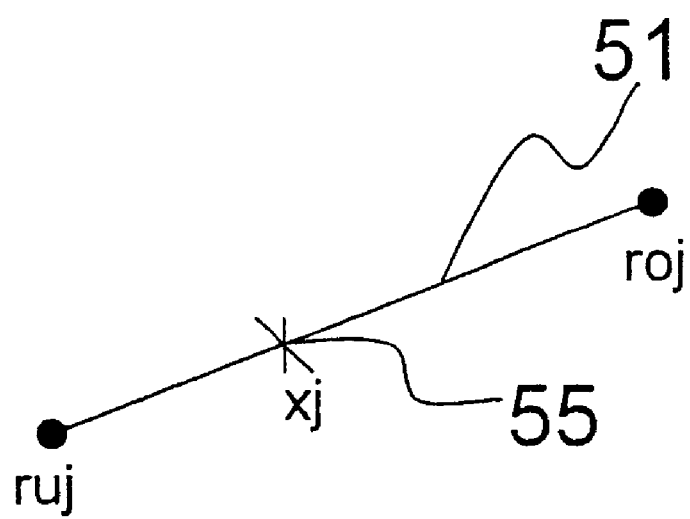
FIG. 4 shows a schematic of the calculation of a reference factor.

In a preferred exemplary embodiment of the present invention, two further characteristics maps are present in a memory of a control unit, the two characteristics maps being defined by at least one operating parameter, and containing limiting characteristics-map values of the incidences of ignition retard, for the worst possible combination of ambient conditions and the best possible combination of ambient conditions. Two such characteristics maps are represented in FIG. 3. In each case, a first operating parameter is again plotted on axis 22, and a second operating parameter is again plotted on axis 24. If, as mentioned above, adaptive characteristics map 20 is defined by one or more than two operating parameters, then the limiting characteristics maps for the best and worst possible combinations of ambient conditions are accordingly defined by one or more than two operating parameters, as well. Once again, the two operating parameters are subdivided into individual ranges to form a matrix of ranges, each so-called master range being assigned a limiting characteristics-map value. Represented in FIG. 3a is a first limiting characteristics map 30 having master ranges 36, each master range 36 being assigned a limiting characteristics-map value bui. The first limiting characteristics map contains the limiting characteristics-map values of the ignition retard for the worst possible ambient conditions. Represented in FIG. 3b is a second limiting characteristics map 40 having master ranges 46, each master range being assigned a limiting characteristics-map value boi. The second limiting characteristics map 40 contains the limiting characteristics-map values of the ignition retard for the best possible ambient conditions. Master ranges 36 and 46 of the first and second limiting characteristics maps, respectively, correspond to operating-parameter ranges 26 of adaptive characteristics map 20. In a further exemplary embodiment, master ranges 36 and 46 of the first and second limiting characteristics maps, respectively, are also formed from several operating-parameter ranges 26.

In order to now ascertain the precontrol component for each operating-parameter range 26 in accordance with the changed ambient conditions, a first factor z, which describes where current ignition-retard value xj 55 lies between first limiting characteristics-map value ruj and second limiting characteristics-map value roj, is calculated as represented in FIG. 5. In this context, limiting characteristics-map values ruj and roj are extracted from master ranges 38 and 48, respectively, of the first and second limiting characteristics maps, the master range containing the values of the operating parameters, which correspond to the current values of the operating parameters of the current ignition-retard value. Limiting characteristics-map values ruj and roj of first limiting characteristics map 30 and second limiting characteristics map 40, respectively, are preferably joined by a straight line, and first factor z is calculated according to the following formula:

$$z = \frac{xj - ruj}{roj - ruj}$$

In other exemplary embodiments, limiting characteristics-map values ruj and roj of first limiting characteristics map 30 and second limiting characteristics map 40, respectively, are joined by other curves, the calculation of first factor z then being carried out in accordance with the curve used.

In the preferred exemplary embodiment, the precontrol component is now ascertained for each operating-parameter range 26 in such a manner, that, for each operating-parameter range 26, the corresponding, first limiting characteristics-map value and the distance between the first and second limiting characteristics-map values (roi–rui) multiplied by factor z are added, and a first intermediate value is ascertained for each operating-parameter range 26. A further exemplary embodiment provides that, for each operating-parameter range 26, the distance between the first and second limiting characteristics-map values (roi–rui) multiplied by factor z is subtracted from the corresponding, second limiting characteristics-map value, and in this manner, a second intermediate value is ascertained for each operating-parameter range 26. Then, in a preferred exemplary embodiment, the residual component ai stored for the specific operating-parameter range is subtracted from the first and second intermediate value for each operating-parameter range 26.

In a further, preferred embodiment, sensors are used to determine if the ambient conditions have changed. In this context, the ambient temperature is measured by, e.g. a temperature sensor and transmitted to the control unit. Alternatively, or in addition, the fuel quality, e.g. the knock resistance, is determined by a further sensor and likewise transmitted to the control unit. If the change in the ambient conditions exceeds a second threshold value, this being determined in step 3, then the method is continued with step 6. The ambient conditions ascertained are compared to the best and worst possible ambient conditions, and a second factor f is calculated, which describes where the ambient conditions present at the specific time are located between the best and worst possible ambient conditions. The method may subsequently be continued as described above, and a new precontrol component bi may be calculated for each operating-parameter range 26. In this context, second factor f is used instead of first factor z.

In a further preferred embodiment, for example in a cylinder-specific engine-knock control system, an adaptive characteristics map is prepared in the memory of the control unit, for each cylinder or for each fixed cylinder group. Each adaptive characteristics map has, in each case, the number of precontrol-component values ai and residual-component values bi corresponding to the number of operating-parameter ranges. This may also be achieved by providing an adaptive characteristics map in the memory of the control unit, the adaptive characteristics map containing a precontrol-component value ai and a residual-component value bi for each operating-parameter range, for each cylinder or each cylinder group. During the determination of whether or not the ambient conditions have changed, the average value of all the current ignition-retard values of the cylinders or cylinder groups is compared to a reference value assigned to the current operating parameters. Such a reference value could be the adaptive characteristics-map value for the specific cylinder or specific cylinder group, in the current operating-parameter range or master range. If the above-described threshold-value comparison reveals that the ambient conditions have changed, then the precontrol component for each cylinder or each cylinder group is adapted to the new ambient conditions in accordance with the above-described method.

After the ambient conditions are changed, the adaptive characteristics-map value read from adaptive characteristics map 20 is therefore given by the sum of residual component ai and the precontrol component bi that has now been determined anew. Precontrol component bi was adjusted for each operating-parameter range, so that an adaptive characteristics-map value adjusted to the new ambient conditions is also present in the event of a shift into a new operating-parameter range 26.

What is claimed is:

1. A method for adjusting an adaptation characteristics map of an adaptive engine-knock control system, comprising:
   defining the adaptive characteristics map at least by an operating parameter, the adaptive characteristics map for each operating-parameter range being made up of a precontrol component that characterizes an ambient condition and a residual component that results from an engine-knock control; and
   providing a value of the adaptive characteristics map for each operating-parameter range as a sum of the precontrol component corresponding to a specific operating-parameter range, and the residual component corresponding to the specific operating-parameter range, by using the following:
      determining if a changed ambient condition has occurred, and
      one of ascertaining a new precontrol component for each operating-parameter range, as a function of the changed ambient condition, if the ambient condition has changed, and holding the precontrol component constant for each operating-parameter range, if the ambient condition has not changed.

2. The method as recited in claim 1, further comprising:
   providing the precontrol component and the residual component for one of each cylinder and each cylinder group; and in response to determining that a change in the ambient condition has taken place, recalculating the precontrol component for the one of each cylinder and each cylinder group, for each operating-parameter range.

3. The method as recited in claim 1, wherein:

a change in the ambient condition is detected when a difference between an ignition-retard value currently required and a reference value taken from the adaptive characteristics map exceeds a specific, fixed, first threshold value.

4. The method as recited in claim 3, further comprising:

calculating the reference value taken from the adaptive characteristics map as an average value from a master range of the adaptive characteristics map corresponding to current operating parameters.

5. The method as recited in claim 3, wherein:

the reference value taken from the adaptive characteristics map corresponds to an adaptive characteristics-map value for current operating parameters.

6. The method as recited in claim 3, wherein:

between a first limiting characteristics-map value, a first limiting characteristics map representing a characteristics map of ignition-retard values for worst possible ambient conditions, and a second limiting characteristics-map value contained in a memory unit, the second limiting characteristics map representing a characteristics map of ignition-retard values for best possible ambient conditions, in which a master range corresponding to current operating parameters is interpolated, a first reference factor is determined in accordance with a position of a current, required ignition-retard value between the first limiting characteristics-map value corresponding to the current operating parameters and the second limiting characteristics-map value corresponding to the current operating parameters, on an interpolation curve connecting the first limiting characteristics-map value and the second limiting characteristics-map value.

7. The method as recited in claim 6, wherein:

the interpolation curve is a straight line for the specific operating-parameter range.

8. The method as recited in claim 6, wherein:

a change in the ambient condition is detected when at least one change in a value measured by at least one sensor exceeds a second, fixed threshold value, the at least one sensor measuring the ambient condition.

9. The method as recited in claim 8, wherein:

the ambient condition measured by the at least one sensor corresponds to one of an ambient temperature and a fuel quality.

10. The method as recited in claim 8, further comprising:

comparing a current ambient condition to a best possible ambient condition and a worst possible ambient condition; and ascertaining a second reference factor as a function of a deviation of the current ambient condition from one of the worst possible ambient condition and the best possible ambient condition.

11. The method as recited in claim 10, further comprising:

ascertaining a new precontrol component for each operating-parameter range such that, for each operating-parameter range, a difference multiplied by one of the first reference factor and the second reference factor is one of added to and subtracted from the first limiting characteristics-map value and the second limiting characteristics-map value, a specific value of the residual component being subsequently subtracted for each operating-parameter range.

12. A method for adaptively controlling a knock of an internal combustion engine, comprising:

reading an ignition-retard value from an adaptive characteristics map;

writing the ignition-retard value into an adaptive characteristics map, the adaptive characteristics map being defined by at least one operating parameter, and the adaptive characteristics map for each operating-parameter range including a precontrol component that characterizes an ambient condition and a residual component that results from an engine-knock control; and determining a value of the adaptive characteristics map for each operating-parameter range as a sum of the precontrol component corresponding to a specific operating-parameter range and the residual component corresponding to the specific operating-parameter range.

13. The method as recited in claim 12, wherein:

in the adaptive characteristics map, the precontrol component and the residual component are provided in each operating-parameter range for one of each cylinder and each cylinder group.

* * * * *